United States Patent
Winterstein et al.

(10) Patent No.: US 8,694,137 B2
(45) Date of Patent: Apr. 8, 2014

(54) SYSTEMS, DEVICES, AND METHODS FOR REMOTE ACCESS

(75) Inventors: Florian Winterstein, Santa Barbara, CA (US); Derek Piasecki, Goleta, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1187 days.

(21) Appl. No.: 11/542,678

(22) Filed: Oct. 2, 2006

(65) Prior Publication Data

US 2008/0082187 A1  Apr. 3, 2008

(51) Int. Cl.
*G06F 17/00* (2006.01)

(52) U.S. Cl.
USPC .............................. 700/94; 381/81

(58) Field of Classification Search
USPC ......................... 700/94; 381/81, 85
See application file for complete search history.

(56) References Cited

U.S. PATENT DOCUMENTS

| | | | |
|---|---|---|---|
| 5,896,500 A | 4/1999 | Ludwig et al. | |
| 6,400,996 B1 | 6/2002 | Hoffberg et al. | |
| 6,640,145 B2 | 10/2003 | Hoffberg et al. | |
| 6,731,609 B1 | 5/2004 | Hirni et al. | |
| 6,850,252 B1 | 2/2005 | Hoffberg | |
| 7,006,881 B1 | 2/2006 | Hoffberg et al. | |
| 2005/0125357 A1* | 6/2005 | Saadat et al. | 705/57 |

OTHER PUBLICATIONS

Schultz, Windows XP Remote Desktop, Part 2: Configuring and Using the Client System, Nov. 28, 2001, http://www.win.net/optimator/WinWiz/Tips/WXPRDP2.htm, pp. 1-7.*
"HP Remote Graphics 3.0.2 User's Guide," [online], Hewlett-Packard Development Company, L.P., Jan. 1, 2005, [retrieved May 9, 2008], Retrieved from the Internet: <http://web.archive.org/web/20060901111843/http://www.cisl.ucar.edu/hss/dasg/services/docs/HPRGUsersGuide.pdf>, pp. 1-79.
International Search Report for corresponding PCT Application No. PCT/US2007/021099, mailed Jun. 10, 2008, 2 pages.
Written Opinion for corresponding PCT Application No. PCT/US2007/021099, mailed Jun. 10, 2008, 6 pages.
Citrix Systems, Inc. Administrator's Guide, Citrix MetaFrame XP Application Server for Windows, Version 1.0, 2001, 270 pages.
Mixer, [online], [retrieved on Sep. 27, 2006]. Retrieved from the Internet: <URL: http://www.borg.com/~jglatt/tech/mixer.htm>, 38 pages.

\* cited by examiner

*Primary Examiner* — Joseph Saunders, Jr.
(74) *Attorney, Agent, or Firm* — McDermott Will & Emery LLP (57) ABSTRACT

A first computer is remotely accessed by a second computer. Sound output is generated at the first computer, but is selectively muted at the first computer and transmitted to, and output at, the second computer.

25 Claims, 4 Drawing Sheets

SYSTEMS, DEVICES, AND METHODS FOR REMOTE ACCESS

TECHNICAL FIELD

The invention generally relates to communications over a computer network. More particularly, the invention relates to systems, devices, and methods for remote access to applications and resources over a computer network.

BACKGROUND

Current technology allows a user of one computer, typically known as the "remote" computer, to access another computer, typically known as the "host" computer. The host computer may be remotely accessed for the purpose of running an application program on the host computer, for managing files on the host computer, or for another reason. For example, an office worker may desire to access his office computer from his home computer, or, while traveling, from a laptop computer in a hotel room, and to run one or more application programs on the office computer. As another example, an individual may desire to access his home computer from a remotely located computer and manage files on his home computer.

Conventionally, the application accessed remotely runs on the host computer, and the visual display output by the host computer is transmitted to, and viewed at, the remote computer. A disadvantage of such systems is that while the video data is transmitted to the remote computer, any associated audio is output only at the host computer. An office worker remotely accessing his office computer and running an application program thereon that outputs audio may therefore annoy his colleagues who are still present at work and located proximate to the remotely accessed host computer. Similarly, an individual remotely accessing his home computer from another computer and running an application program thereon that outputs audio may annoy his family members who are still at home and within earshot of the home computer. While it is possible to take manual steps to remotely mute the application program running on the host computer, this approach has several disadvantages, including reliance on the user's awareness of the problem and his willingness to take steps to ameliorate it.

One prior-art approach to solving the above-described problem involves the installation of a virtual sound card driver on the host computer. In such prior-art systems, when the host computer is accessed remotely, steps are taken to change the default audio output device (e.g., the sound card driving the output jacks that connect to the host computer's speakers) to the virtual sound card driver. In such systems, the virtual sound card driver is not configured to generate or output audio at the host computer, but nevertheless permits the audio to be output at the remote computer. This approach requires the installation of a virtual sound card driver, which adds cost and inconvenience, and may not even be compatible with the security privileges allotted to a user.

SUMMARY OF THE INVENTION

The present invention relates to systems, devices, and methods that mute the audio output by an application program at a host computer without direct user intervention and that transmit the audio for output at a remote computer, all without the need to install a virtual sound card driver or other physical device at the host computer. More specifically, embodiments of the present invention enable the output line of a default output device on the host computer to be muted, while sound transmitted along a loopback input line of the default output device is simultaneously captured. That captured sound may then be transmitted to the remote computer for output thereat. Thus, one advantage of the invention is that a user operating the remote computer may enjoy the audio output of an application program running on the host computer, without annoying those in the presence of the host computer. Moreover, according to another advantage of the invention, the expense and security issues associated with installing a virtual sound card driver, or other physical device, on the host computer are eliminated.

In an embodiment of the invention, the audio output at a host computer is automatically (i.e., without user intervention) muted in response to a remote access request from a remote computer. Accordingly, the remote user need not spend his time reconfiguring the host computer system in order the mute the output of audio thereat. Moreover, the possibility that the remote user will forget to mute the audio at the host computer, and thereby inadvertently annoy those in the presence of the host computer, is eliminated by the present invention.

In general, in one aspect, the invention features a method for remote access. More specifically, sound output is generated at a first computer. The presentation of the sound output is muted at the first computer and the sound output is transmitted to a second computer.

In general, in another aspect, the invention features a computer-readable storage medium containing instructions for a general purpose computer having a sound card capable of generating a sound output. The set of instructions includes instructions for muting the presentation of sound output generated at a first computer without direct user intervention and instructions for transmitting the sound output to a second computer.

Various embodiments of the invention can include the following features, or computer-readable instructions for implementing the following features. The sound output generated at the first computer may be generated by a sound card at the first computer and the presentation of the sound output at the first computer may be muted by muting a local analog line output. In addition, transmitting the sound output to the second computer may include recording a local analog line output, which may be a loopback recording input. The transmitted sound output may also be presented at the second computer. In some embodiments, for example when the first computer is disconnected from the second computer at the end of a communication session, the presentation of the sound output at the first computer may be unmuted.

In some embodiments, the contents of a display of the first computer may be transmitted to the second computer. Optionally, the contents of the display of the first computer may be stored in a display memory (e.g., a frame buffer) prior to transmitting the contents to the second computer. The contents of the display of the first computer may also be displayed at the second computer following transmission thereto.

In general, in yet another aspect, the invention features a first computer. The first computer includes a sound card configured to generate a sound output, software for muting the presentation of the sound output at the first computer without direct user intervention, and software for transmitting the sound output to a second computer.

In various embodiments, the first computer further includes a display and software for transmitting the contents of the display to the second computer. In addition, the first computer may include a display memory for storing the contents of the display prior to transmitting the contents of the display to the second computer. The first computer may also include software for unmuting, for example when the first computer is disconnected from the second computer at the end of a communication session, the presentation of the sound output at the first computer. The sound card of the first computer may include a local analog line output configured to output the generated sound output, and may also include a loopback recording input for recording the generated sound output.

In general, in still another aspect, the invention features another method for remote access. In accordance with this method, a request for remote access is received at a first computer from a second computer and, in response to the request, the sound at the first computer is automatically muted without user intervention. More specifically, in one embodiment, the sound output generated by a sound card at the first computer may be automatically muted without user intervention.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DESCRIPTION

In general, the present invention pertains to systems, devices, and methods for remote access. In broad overview, in accordance with one aspect of the invention, a first computing device, for example a host computer, receives a request for remote access from a second computing device, for example a remote computer, over a computer network. In one embodiment, the request for remote access is associated with a request to run an application program, for example an application program that typically outputs sound through a sound card, on the host computer. In response to the request, however, the sound output by the sound card is automatically (i.e., without user intervention) muted at the host computer. Nevertheless, the sound output by the sound card may be transmitted to the remote computer for presentation thereat. In addition, the contents of a display of the host computer may be transmitted to the remote computer for presentation there as well.

Figure 1:
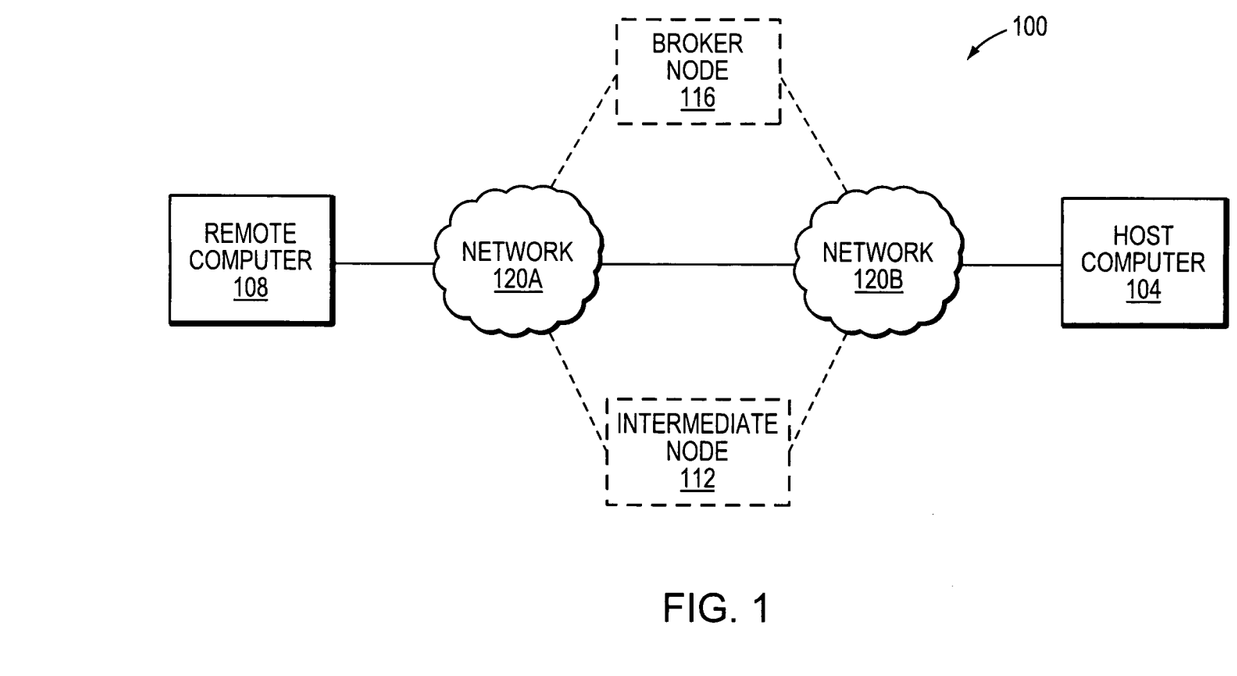
FIG. 1 is a block diagram of an illustrative embodiment of a system for remote access, including a host computer and a remote computer, in accordance with the invention.

FIG. 1 depicts a system 100 for remote access according to an illustrative embodiment of this aspect of the invention. The system 100 includes a first computer (i.e., host computer 104) and a second computer (i.e., remote computer 108). In addition, the system 100 may optionally include an intermediate node 112, a broker node 116, and networks 120A, 120B. The networks 120A and 120B may be separate networks, or they may in fact be the same network. Additional networks may also be present to facilitate the communication between the computers and nodes illustrated in FIG. 1.

Either or both networks 120A and 120B may be, for example, a local-area network (LAN), such as a company intranet, a metropolitan area network (MAN), or a wide area network (WAN), such as the Internet. The various computers and nodes illustrated in FIG. 1 may be connected to the networks 120A and/or 120B through a variety of connections including, but not limited to, standard telephone lines, LAN or WAN links (e.g., T1, T3, 56 kb, X.25), broadband connections (e.g., ISDN, Frame Relay, ATM), or wireless connections. The connections, moreover, may be established using a variety of communication protocols (e.g., HTTP, TCP/IP, IPX, SPX, NetBIOS, NetBEUI, SMB, Ethernet, ARCNET, Fiber Distributed Data Interface (FDDI), RS232, IEEE 802.11, IEEE 802.11a, IEEE 802.11b, IEEE 802.11g, and direct asynchronous connections).

Each of the host computer 104 and the remote computer 108 may be any type of personal computer, Windows-based terminal, network computer, wireless device, information appliance, RISC Power PC, X-device, workstation, mini computer, main frame computer, personal digital assistant, set top box, handheld device, or other computing device that is capable of both presenting information/data to, and receiving commands from, a user of the host computer 104 and the remote computer 108, respectively. In particular, in one embodiment, each of the host computer 104 and the remote computer 108 include a sound card that is configured to generate a sound output for presentation to a user of the computer 104, 108. In addition, either or both the host computer 104 and remote computer 108 may include a visual display device (e.g., a computer monitor), a data entry device (e.g., a keyboard), persistent and/or volatile storage (e.g., computer memory), a processor, and a mouse. In one embodiment, the host computer 104 and remote computer 108 each include a web browser, such as, for example, the INTERNET EXPLORER program developed by Microsoft Corporation of Redmond, Wash., to connect to the World Wide Web.

Each of the intermediate node 112 and the broker node 116 may be any computing device capable of receiving information/data from, and delivering information/data to, the host computer 104 and remote computer 108, for example over the networks 120A and 120B. For example, the intermediate node 112 may be a communication server that facilitates the communication of information over the networks 120A, 120B between the host computer 104 and the remote computer 108. For its part, the broker node 116 may facilitate the connection of the host computer 104 and the remote computer 108 to the intermediate node 112 by, for example, initially identifying the intermediate node 112 as the node to which they should connect and providing the passwords, security information, and/or other identifying information necessary to establish those connections.

It will be understood by those skilled in the art that FIG. 1 is a simplified, conceptual illustration of the system 100 and that it is depicted as such for purposes of explanation. For example, more than one host computer 104, more than one remote computer 108, and more than one intermediate node 112 may be present in the system 100. In addition, the system 100 need not necessarily include an intermediate node 112 or the broker node 116. For example, the host computer 104 and remote computer 108 may instead communicate with one another over only a network 120A or 120B. As such, the depiction of the system 100 in FIG. 1 is non-limiting.

Figure 2:
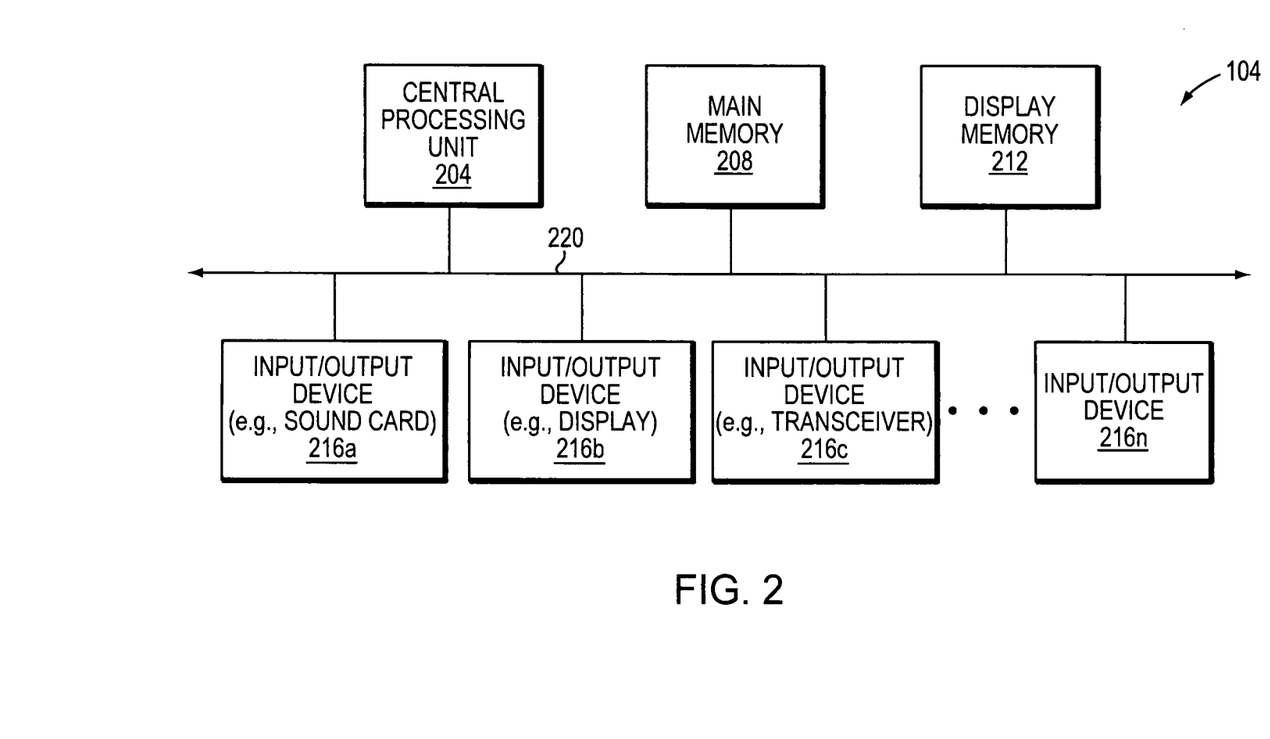
FIG. 2 is a block diagram of an illustrative embodiment of the host computer depicted in FIG. 1 in accordance with the invention.

FIG. 2 depicts the host computer 104 of FIG. 1 according to an illustrative embodiment of the invention. As shown, the host computer 104 may include a central processing unit 204, a main memory 208, a display memory 212, and one or more input/output devices 216a-216n. In addition, the host computer 104 may include a system bus 220 for allowing the various components of the host computer 104 to communicate amongst themselves.

The central processing unit 204 may be any logic circuitry that responds to and processes instructions fetched from the main memory 208. In many embodiments, the central processing unit 204 is provided by a microprocessor unit such as one of the many microprocessor units manufactured by Intel Corporation of Mountain View, Calif.

Main memory 208 and display memory 212 may each be provided by one or more memory chips capable of storing data and allowing any storage location to be directly accessed by the central processing unit 204. In one embodiment, the main memory 208 stores software for transmitting to the remote computer 108 sound output generated at the host computer 104, software for muting the presentation of the sound output at the host computer 104, software for unmuting the presentation of the sound output at the host computer 104, and/or software for transmitting to the remote computer 108 the contents of a display of the host computer 104. Similarly, the display memory 212 may store the contents of the host computer's display prior to the transmission of the contents to the remote computer 108. In one embodiment, the display memory 212 is implemented as a frame buffer.

As described in greater detail below with respect to FIG. 4, the central processing unit 204 may fetch via the system bus 220, execute, and process the instructions present in the various software programs stored in the main memory 208. The central processing unit 204 may then write, via the system bus 220, any results to the main memory 208 and/or to the display memory 212. Moreover, the central processing unit 204 may receive input from, and direct output to, one or more of the input/output devices 216a-216n, again via the system bus 220. Various busses may be used as the system bus 220, such as, for example, a VESA VL bus, an ISA bus, an EISA bus, a MicroChannel Architecture (MCA) bus, a PCI bus, a PCI-X bus, a PCI-Express bus, or a NuBus.

A wide variety of input/output devices 216a-216n may be present in the host computer 104. For example, input devices that may be present include keyboards, mice, trackpads, trackballs, microphones, and drawing tablets. Exemplary output devices include video displays, speakers, inkjet printers, laser printers, and dye-sublimation printers. An input/output device such as a hard disk drive, a floppy disk drive for receiving floppy disks such as 3.5-inch disks, 5.25-inch disks, or ZIP disks, a CD-ROM drive, a CD-R/RW drive, a DVD-ROM drive, a tape drive of various formats, and/or a USB storage device may also provide mass storage for the host computer 104.

In one particular embodiment, as depicted in FIG. 2, the input/output device 216a is a sound card configured to generate a sound output, the input/output device 216b is a visual display, and the input/output device 216c is a transceiver for communicating with the remote computer 108 over the networks 120A, 120B.

Figure 3:
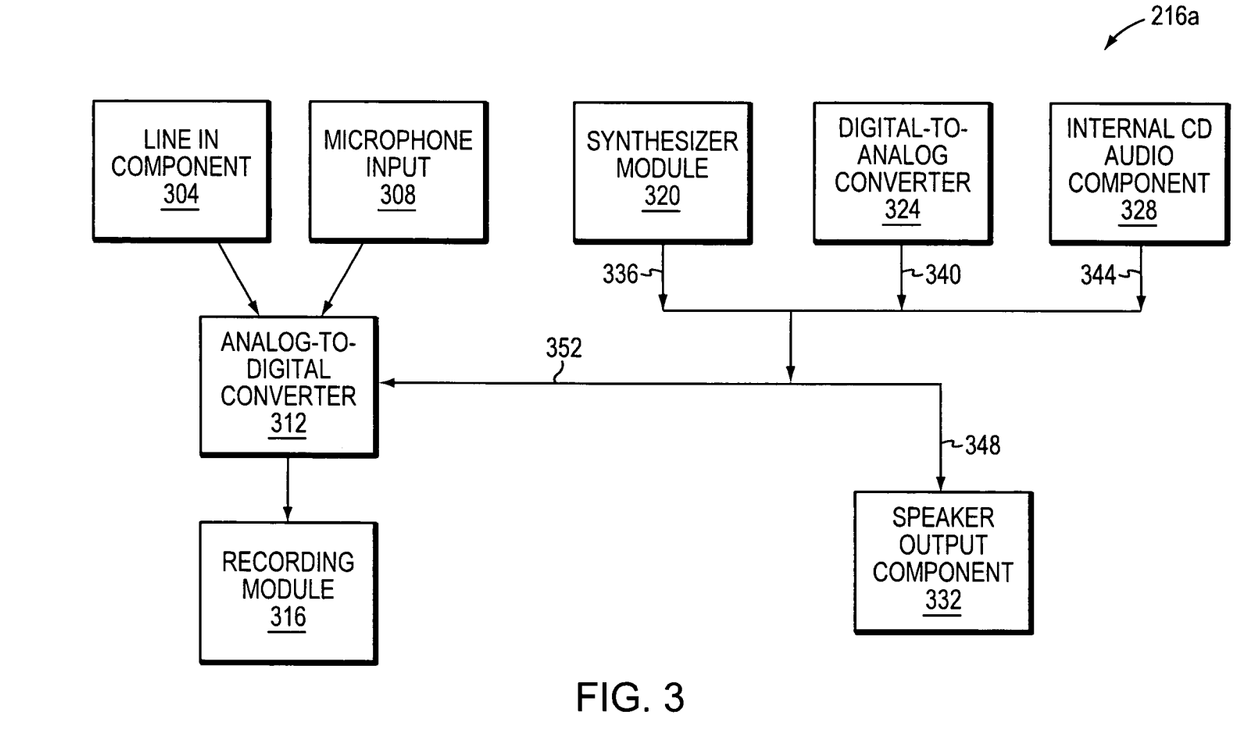
FIG. 3 is a block diagram of an illustrative embodiment of a hardware layout for a sound card of the host computer in accordance with the invention.

FIG. 3 depicts a hardware layout of the sound card 216a of the host computer 104 according to an illustrative embodiment of the invention. As illustrated, the sound card 216a is capable of both recording audio and of playing back audio. To enable the recording of audio, the sound card 216a may include a line-in component 304 so that the audio signal from an external tape deck or musical instrument or from an external hardware mixer can be digitized and recorded, a microphone input 308, an analog-to-digital converter 312 for converting analog input signals to digital signals for recording, and a recording module 316. To enable playback of audio, the sound card 216a may include a synthesizer module 320 capable of playing musical instrument digital interface (MIDI) data, a digital-to-analog converter 324 for converting digital signals to analog signals for playback, an internal CD audio component 328 to connect the audio out of the CD-ROM drive of the host computer 104, and a speaker output component 332 that outputs audio signals to a set of speakers local to the host computer 104.

As illustrated in FIG. 3, the source lines 336, 340, and 344 originating from the synthesizer module 320, the digital-to-analog converter 324, and the internal CD audio component 328, respectively, all connect to a destination speaker line 348. The destination speaker line 348 is a local analog line output that connects to the speaker output component 332 and that is configured to output sound generated by, or originating from, the synthesizer module 320, the digital-to-analog converter 324, or the internal CD audio component 328. In addition, the source lines 336, 340, and 344 also all connect to a loopback recording input line 352. The loopback recording input line 352 is a local analog line output that connects to the analog-to-digital converter 312 (and thus to the recording module 316) to enable the recording of sound generated by, or originating from, the synthesizer module 320, the digital-to-analog converter 324, or the internal CD audio component 328.

It will again be understood by those skilled in the art that FIGS. 2 and 3 are, respectively, exemplary illustrations of one embodiment of the host computer 104 and of one embodiment of a possible a hardware layout for the sound card 216a of the host computer 104, and that FIGS. 2 and 3 are depicted as such for purposes of explanation. As such, the depictions and descriptions of the host computer 104 (FIG. 2) and of the hardware layout for the sound card 216a (FIG. 3) are non-limiting. It should also be noted that, for its part, the remote computer 108 may be designed and implemented as described for the host computer 104, or it may be implemented and designed differently.

Figure 4:
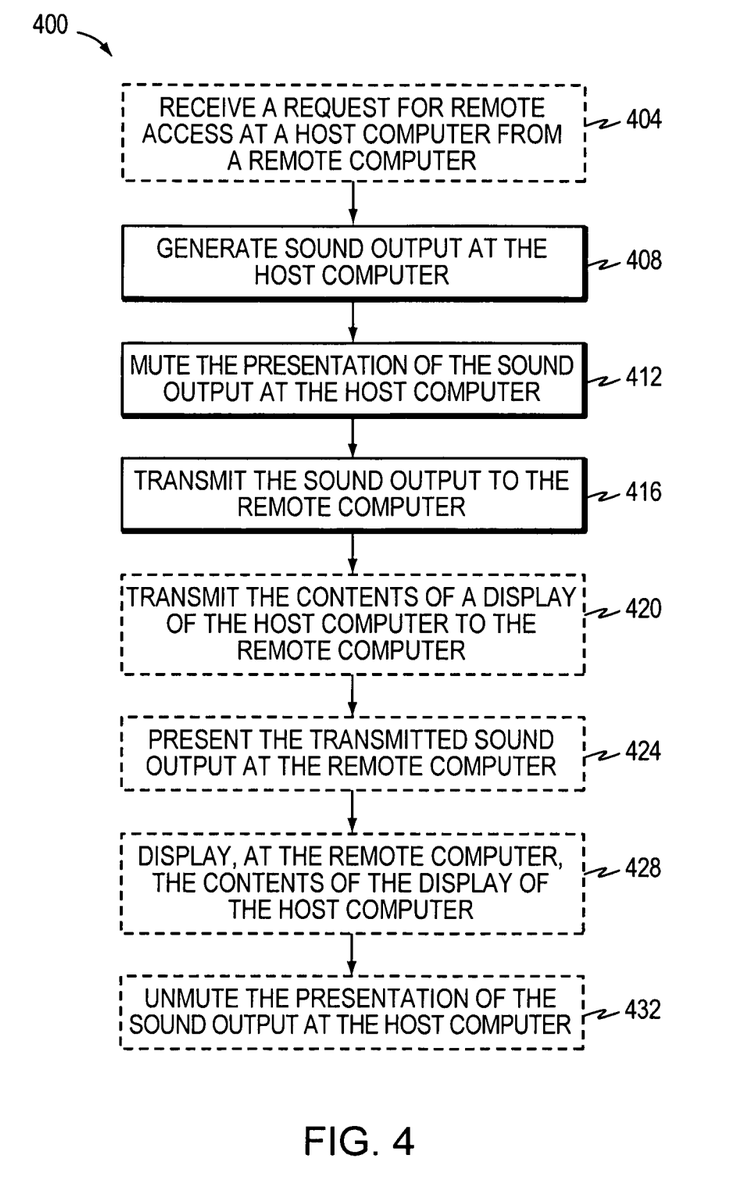
FIG. 4 is a flow diagram of an illustrative embodiment of a method for remote access in accordance with the invention.

With reference now to FIG. 4, in one embodiment of a method 400 for remote access, for example using the system 100 depicted in FIG. 1, the host computer 104 depicted in FIG. 2, and the sound card 216a depicted in FIG. 3, sound output is generated at the host computer 104 at step 408, the presentation of the sound output is muted at the host computer 104 at step 412 without direct user intervention, and the sound output is transmitted to the remote computer 108 at step 416. Optionally, prior to step 408, the method 400 may also include receiving a request for remote access at the host computer 104 from the remote computer 108 (step 404). In addition, the method 400 may also optionally include transmitting the contents of the display 216b of the host computer 104 to the remote computer 108 (step 420), presenting the transmitted sound output at the remote computer 108 (step 424), displaying, at the remote computer 108, the contents of the display 216b of the host computer 104 (step 428), and/or unmuting the presentation of the sound output at the host computer 104 (step 432).

In greater detail, and with reference to FIGS. 1-4, a request for remote access is received at the host computer 104 from the remote computer 108 at step 404. In one embodiment, the host computer 104 automatically (i.e., without user interaction) polls the broker node 116 to determine whether a remote computer 108 is requesting remote access to the host computer 104. If not, the host computer 104 may continue to automatically poll the broker node 116 (for example, every 15 seconds or another period of time) to make the same determination, until a remote computer 108 does in fact request access to the host computer 104. When desiring remote access to the host computer 104, the remote computer 108 may transmit a message to the broker node 116 indicating that it desires such access. The broker node 116 may then transmit separate messages to both the host computer 104 and the remote computer 108, providing each of them with session co-ordinates for an online communication session. The session co-ordinates may indicate, for example, the intermediate node 112 to which the host computer 104 and the remote computer 108 are to connect, and may include identification/password information for authenticating and establishing their respective connections to the intermediate node 112.

Upon receiving the session co-ordinates for the online communication session, the host computer 104 and/or remote computer 108 may each be configured to automatically (i.e., without user interaction) establish and authenticate connections to the intermediate node 112. Alternatively, the host computer 104 and/or remote computer 108 may each require a user to input the identification/password information in order to establish and authenticate each of their respective connections to the intermediate node 112. Once authenticated by the intermediate node 112, the host computer 104 and remote computer 108 are each connected to the online communication session and may proceed to bi-directionally communicate information with one another. For example, a user at the remote computer 108 may proceed to remotely run and execute an application program on the host computer 104.

In one embodiment, at step 408, the user at the remote computer 108 remotely runs and executes, on the host computer 104, an application program that generates sound output through the sound card 216a. More specifically, the application program may generate a digital audio signal that is converted to an analog audio output signal by the digital-to-analog converter 324 of the sound card 216a. That sound output that is generated by the sound card 216a of the host computer 104 is routed to the speaker output component 332 of the sound card 216a via the destination speaker line 348. In addition, that sound output is also routed to the recording module 316 of the sound card 216a via the loopback recording input line 352 and the analog-to-digital converter 312 of the sound card 216a.

In one embodiment, however, prior to the presentation of the sound output at the host computer 104 (i.e., prior to playing the sound output on the speakers local to the host computer 104), the central processing unit 204 of the host computer 104 executes software stored in the main memory 208 of the host computer 104 to automatically mute, at step 412, the presentation of the sound output at the host computer 104. For example, in one particular embodiment, the central processing unit 204 automatically invokes and employs the Windows Mixer Application Programming Interface (API) to mute the destination speaker line 348 of the sound card 216a. More specifically, the Windows Mixer API may be employed to query the host computer 104 to determine both the ID of the default playback device (e.g., the sound card 216a) and the name of that device ID. The devices 216a-216n on the host computer system 104 may then be enumerated until the default playback device (e.g., the sound card 216a) is found. Once the sound card 216a is found, its lines may be enumerated until the destination speaker line 348 is found. Finally, the controls for the sound card 216a may be enumerated until the appropriate control is found and the mute flag is set on that control. Accordingly, sound is automatically (i.e., without user intervention) muted at the remotely accessed host computer 104.

The central processing unit 204 may also, at step 416, execute software stored in the main memory 208 to transmit to the remote computer 108 the sound output generated by the sound card 216a at the host computer 104. In one embodiment, the central processing unit 204 does so substantially simultaneously with the execution, at step 412, of the software for muting the presentation of the sound output generated by the sound card 216a at the host computer 104. For example, in one particular embodiment, the central processing unit 204 again employs the Windows Mixer API to detect and enable the loopback recording input line 352 of the sound card 216a. More specifically, the Windows Mixer API may be employed to query the host computer 104 to determine both the ID of the default playback device (e.g., the sound card 216a) and the name of that device ID. Each device 216a-216n on the host computer system 104 having a recording input may then be enumerated and each of the input names on the devices 216a-216n having a recording input may also be enumerated. The default device (e.g., the sound card 216a) and the recording input (e.g., the loopback recording input line 352) from which the sound should be recorded may then be determined. Such a determination may be made by, for example, giving each combination of i) device 216a-216n having a recording input and ii) input name a score based on a) whether the name of the device 216a-216n having a recording input matches the name of the device ID for the default playback device and b) whether the input name matches the name of a known loopback recording input line. The combination of device 216a-216n having a recording input and input name having the best score (e.g., the sound card 216a and the loopback recording input line 352) may then be selected as the device and recording input from which the sound will be recorded. Once, for example, the sound card 216a and the loopback recording input line 352 are so selected, the devices 216a-216n on the host computer system 104 may again be enumerated until the sound card 216a is found, and the lines on the sound card 216a may again be enumerated until the loopback recording input line 352 is found. Finally, the controls for the sound card 216a may be enumerated until the appropriate control is found and the active input flag for the loopback recording input line 352 may then be set. Once the Windows Mixer API detects and enables the loopback recording input line 352 of the sound card 216a, the sound output on the line 352 may be recorded. More specifically, in one embodiment, the analog output signal transmitted in the line 352 is converted to a digital signal by the digital-to-analog converter 312 of the sound card 216a and then recorded by the recording module 316. The recorded sound output may then be packetized, compressed, and transmitted to the remote computer 108 via the transceiver 216c of the host computer 104.

In one embodiment, the remote execution of the application program on the host computer 104 also generates visual data for output on the display 216b of the host computer 104. In one embodiment, the central processing unit 204 of the host computer 104 executes software stored in the main memory 208 of the host computer 104 to transmit, at step 420, the contents of the display 216b to the remote computer 108. For example, the central processing unit 204 may cause the contents output on the display 216b of the host computer 104 to also be stored in the display memory 212 of the host computer 104. The central processing unit 204 may then packetize and compress the contents stored in the display memory 212 and cause those contents to be transmitted to the remote computer 108 via the transceiver 216c of the host computer 104.

In one embodiment, the contents of the host computer's display 216b are transmitted to the remote computer 108 via a channel different from that used to transmit the sound output at step 416. Alternatively, in another embodiment, the contents of the host computer's display 216b and the sound output are interleaved and transmitted via the same channel. In either case, both the sound output and the contents of the host computer's display may be transmitted in manner that permits the re-synchronization of the sound output and the visual display data at the remote computer 108. For example, instructions for re-synchronizing the sound output and the visual display data may be transmitted to the remote computer 108. In still another embodiment, when the detected bandwidth of the networks 120A, 120B is insufficient to transmit both the sound output and the contents of the host computer's display 216b, only the contents of the host computer's display 216b are transmitted to the remote computer 108.

Upon receiving the transmitted sound output at the remote computer 108, the sound output may be presented thereat at step 424. For example, the sound card present in the remote computer 108 outputs the sound to speakers local to the remote computer 108. Similarly, upon receiving at the remote computer 108 the contents of the display 216b of the host computer 104, those contents may be displayed at the remote computer 108 at step 428. For example, the remote computer's central processing unit executes instructions that cause the remote computer's display to display those contents. Again, the remote computer 108 may execute instructions to present the sound output and the contents of the display 216b of the host computer 104 in proper synchronization with one another.

At some point, the user of the remote computer 108 may desire to terminate his remote connection to the host computer 104, for example when he is finished remotely executing the application program on the host computer 104. At that stage, the application program that was executing on the host computer 104 is closed, the communication session between the remote computer 108 and host computer 104 is terminated, and the method 400 proceeds to step 432, where the central processing unit 204 of the host computer 104 executes software stored in the main memory 208 of the host computer 204 to unmute the presentation of the sound output at the host computer 104. For example, in one particular embodiment, the central processing unit 204 employs the Windows Mixer API to unmute the destination speaker line 348 of the sound card 216a. Accordingly, sound may again be presented at the host computer 104.

Accordingly, in addition to other advantages, the present invention is capable of automatically (i.e., without user intervention) muting the presentation of sound at the remotely accessed host computer 104, while still transmitting such sound to the remote computer 108 for presentation thereat. As such, the user's experience is preserved at the remote computer 108, but those in the vicinity of the host computer 104 are not disturbed by sounds emanating therefrom.

It should also be noted that embodiments of the present invention may be provided as one or more computer-readable programs embodied on or in one or more computer-readable storage mediums. The computer-readable storage medium may be a floppy disk, a hard disk, a CD ROM, a flash memory card, a PROM, a RAM, a ROM, or a magnetic tape. In general, the computer-readable programs, which may include instructions for a general purpose computer capable of generating sound output as described above, may be implemented in any programming language. Some examples of languages that can be used include C, C++, or JAVA. In addition, the computer-readable programs may be stored on or in the one or more computer-readable storage mediums as object code.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method for remote access, the method comprising:
generating an analog sound output at a first computer by a sound card of the first computer;
routing the analog sound output to a destination speaker of the sound card of the first computer and to an analog-to-digital converter of the sound card of the first computer;
automatically muting, without user intervention, the presentation of the analog sound output at the first computer by automatically muting the destination speaker of the sound card of the first computer;
recording a digital sound output from the analog-to-digital converter of the sound card of the first computer; and
transmitting the recorded digital sound output to a second computer.

2. The method of claim 1 further comprising presenting the transmitted recorded digital sound output at the second computer.

3. The method of claim 1 further comprising unmuting the presentation of the analog sound output at the first computer.

4. The method of claim 1 wherein automatically muting the presentation of the analog sound output comprises automatically muting a local analog line output.

5. The method of claim 1 wherein transmitting the recorded digital sound output to the second computer comprises recording a local analog line output.

6. The method of claim 5 wherein the local analog line output is a loopback recording input.

7. The method of claim 1 further comprising transmitting contents of a display of the first computer to the second computer.

8. The method of claim 7 further comprising storing the contents of the display of the first computer in a display memory prior to transmitting the contents to the second computer.

9. The method of claim 7 further comprising displaying, at the second computer, the contents of the display of the first computer.

10. The method of claim 1, wherein the analog sound output is generated by the sound card of the first computer while the destination speaker of the sound card is muted.

11. A first computer comprising:
a sound card configured to generate an analog sound output and to route the analog sound output to a destination speaker of the sound card of the first computer and to an analog-to-digital converter of the sound card of the first computer;
software for automatically muting, without user intervention, the presentation of the analog sound output at the first computer by automatically muting the destination speaker of the sound card;

software for recording a digital sound output from the analog-to-digital converter of the sound card of the first computer; and software for transmitting the recorded digital sound output generated by the analog-to-digital converter of the sound card to a second computer.

12. The first computer of claim 11 further comprising a display and software for transmitting contents of a display to the second computer.

13. The first computer of claim 12 further comprising a display memory for storing the contents of the display prior to transmitting the contents of the display to the second computer.

14. The first computer of claim 11 further comprising software for unmuting the presentation of the analog sound output at the first computer.

15. The first computer of claim 11 wherein the sound card comprises a local analog line output configured to output the generated analog sound output.

16. The first computer of claim 11 wherein the sound card comprises a loopback recording input for recording the generated analog sound output.

17. A non-transitory computer-readable storage medium containing instructions for a first computer having a sound card capable of generating an analog sound output, the set of instructions comprising:

instructions for routing the analog sound output to a destination speaker of the sound card of the first computer and to an analog-to-digital converter of the sound card of the first computer;

instructions for automatically muting, without user intervention, the presentation of the analog sound output generated at the first computer by the sound card of the first computer by automatically muting the destination speaker of the sound card of the first computer;

instructions for recording a digital sound output from the analog-to-digital converter of the sound card of the first computer; and instructions for transmitting the recorded digital sound output to a second computer.

18. The computer-readable storage medium of claim 17 further comprising instructions for presenting the transmitted recorded digital sound output at the second computer.

19. The computer-readable storage medium of claim 17 further comprising instructions for unmuting the presentation of the analog sound output at the first computer.

20. The computer-readable storage medium of claim 17 wherein the instructions for automatically muting the presentation of the analog sound output comprise instructions for automatically muting a local analog line output.

21. The computer-readable storage medium of claim 17 wherein the instructions for transmitting the recorded digital sound output to a second computer comprise instructions for recording a local analog line output.

22. The computer-readable storage medium of claim 17 further comprising instructions for transmitting contents of a display of the first computer to the second computer.

23. The computer-readable storage medium of claim 22 further comprising instructions for storing the contents of the display of the first computer in a display memory prior to transmitting the contents to the second computer.

24. The computer-readable storage medium of claim 22 further comprising instructions for displaying, at the second computer, the contents of the display of the first computer.

25. A method for remote access, the method comprising:

receiving a request for remote access at a first computer from a second computer; and in response to the request:

automatically muting, without user intervention, presentation of a generated analog sound output at the first computer by automatically muting a destination speaker of a sound card of the first computer;

recording digital sound output from an analog-to-digital converter of the sound card of the first computer; and transmitting the recorded digital sound output to the second computer.

* * * * *